(12) United States Patent
Inoue et al.

(10) Patent No.: US 12,181,008 B2
(45) Date of Patent: Dec. 31, 2024

(54) DISC BRAKE

(71) Applicant: Hitachi Astemo, Ltd., Ibaraki (JP)

(72) Inventors: Hayuru Inoue, Hitachinaka (JP); Kumi Hashimoto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 342 days.

(21) Appl. No.: 17/637,578

(22) PCT Filed: Aug. 13, 2020

(86) PCT No.: PCT/JP2020/030748
§ 371 (c)(1),
(2) Date: Feb. 23, 2022

(87) PCT Pub. No.: WO2021/039413
PCT Pub. Date: Mar. 4, 2021

(65) Prior Publication Data
US 2022/0275842 A1 Sep. 1, 2022

(30) Foreign Application Priority Data
Aug. 28, 2019 (JP) .................. 2019-155490

(51) Int. Cl.
F16D 65/097 (2006.01)
B60T 1/06 (2006.01)
F16D 55/226 (2006.01)

(52) U.S. Cl.
CPC .......... *F16D 65/0976* (2013.01); *B60T 1/065* (2013.01); *F16D 55/226* (2013.01)

(58) Field of Classification Search
CPC .. F16D 65/0976; F16D 55/227; F16D 55/226; F16D 65/0972; B60T 1/065
See application file for complete search history.

(56) References Cited

FOREIGN PATENT DOCUMENTS

| EP | 0 094 736 A1 | 11/1983 |
| JP | 58-167328 U | 11/1983 |
| JP | 8-226470 A | 9/1996 |
| JP | 2006-38135 A | 2/2006 |

(Continued)

OTHER PUBLICATIONS

Japanese Patent No. JP 2015068432 to Hashimoto et al published on Apr. 13, 2015.*

(Continued)

*Primary Examiner* — Pamela Rodriguez
(74) *Attorney, Agent, or Firm* — MATTINGLY & MALUR, PC

(57) ABSTRACT

This disc brake includes an attachment member having a pad guide part, a pair of friction pads, a caliper, and a pad spring. The pad guide part includes a recessed part, which is recessed in a disc rotation direction with respect to a bottom surface in a region on a disc radial direction outer side, in a region of a bottom part of the pad guide part on a disc radial direction inner side. The pad spring includes a guide part provided to be able to come into contact with a wall surface and the bottom surface of the pad guide part on the disc radial direction outer side and configured to guide movement of a protruding part in a disc axial direction, and a fitting part protruding in the disc rotation direction from the guide part and configured to elastically fit into the recessed part.

2 Claims, 7 Drawing Sheets

(56) References Cited

FOREIGN PATENT DOCUMENTS

| | | |
|---|---|---|
| JP | 2010-236615 A | 10/2010 |
| JP | 6212758 B2 | 10/2017 |

OTHER PUBLICATIONS

Japanese Patent No. JP 2019148285 to Hirashima et al published on Sep. 5, 2019.*
International Search report received in corresponding International Application No. PCT/JP2020/030748 dated Sep. 29, 2020.
Written Opinion received in corresponding International Application No. PCT/JP2020/030748 dated Sep. 29, 2020.
Indian Office Action received in corresponding Indian Application No. 202217009197 dated Jun. 20, 2022.

* cited by examiner

DISC BRAKE

TECHNICAL FIELD

The present invention relates to a disc brake.

Priority is claimed on Japanese Patent Application No. 2019-155490 filed on Aug. 28, 2019, the contents of which are incorporated herein by reference.

BACKGROUND ART

In a disc brake with a structure supported by inserting a protruding part of a friction pad into a recessed pad guide part of an attachment member, there are those in which the friction pad is biased by a pad spring (see, for example, Patent Documents 1 and 2 below).

CITATION LIST

Patent Document

Patent Document 1

Japanese Unexamined Patent Application, First Publication No. H8-226470

Patent Document 2

Japanese Patent No. 6212758

SUMMARY OF INVENTION

Technical Problem

In disc brakes, it is desired to suppress a slight-pressure squeal which is a brake squeal generated during slight-pressure braking.

An objective of the present invention is to provide a disc brake in which a slight-pressure squeal generated during slight-pressure braking can be suppressed.

Solution to Problem

In order to achieve the above-described objective, the present invention employs the following aspects.

That is, one aspect of the present invention is a disc brake which brakes rotation of a disc rotating together with wheels of a vehicle, and when a rotation direction of the disc is a disc rotation direction, a direction in which a central axis of the disc extends is a disc axial direction, a center side of the disc in a radial direction is a disc radial direction inner side, and a side opposite to the center side of the disc in the radial direction is a disc radial direction outer side, the disc brake includes an attachment member configured to be attached to a non-rotating portion of the vehicle and including a pad guide part having a shape recessed in the disc rotation direction, a pair of friction pads each including a protruding part inserted into the pad guide part and configured to be movable in the disc axial direction by the protruding part being guided by the pad guide part, a caliper provided to be slidable with respect to the attachment member and configured to press the pair of friction pads against both sides of the disc, and a pad spring attached to the attachment member and elastically supporting each of the friction pads, in which the pad guide part includes a recessed part, which is recessed in the disc rotation direction with respect to a bottom surface in a region on the disc radial direction outer side, in a region of a bottom part of the pad guide part on the disc radial direction inner side, and the pad spring includes a guide part provided to be able to come into contact with a wall surface and the bottom surface of the pad guide part on the disc radial direction outer side and configured to guide movement of the protruding part in the disc axial direction, and a fitting part protruding in the disc rotation direction from the guide part and configured to elastically fit into the recessed part.

Advantageous Effects of Invention

According to the present invention, a slight-pressure squeal generated during slight-pressure braking can be suppressed.

DESCRIPTION OF EMBODIMENTS

First Embodiment

Figure 1:
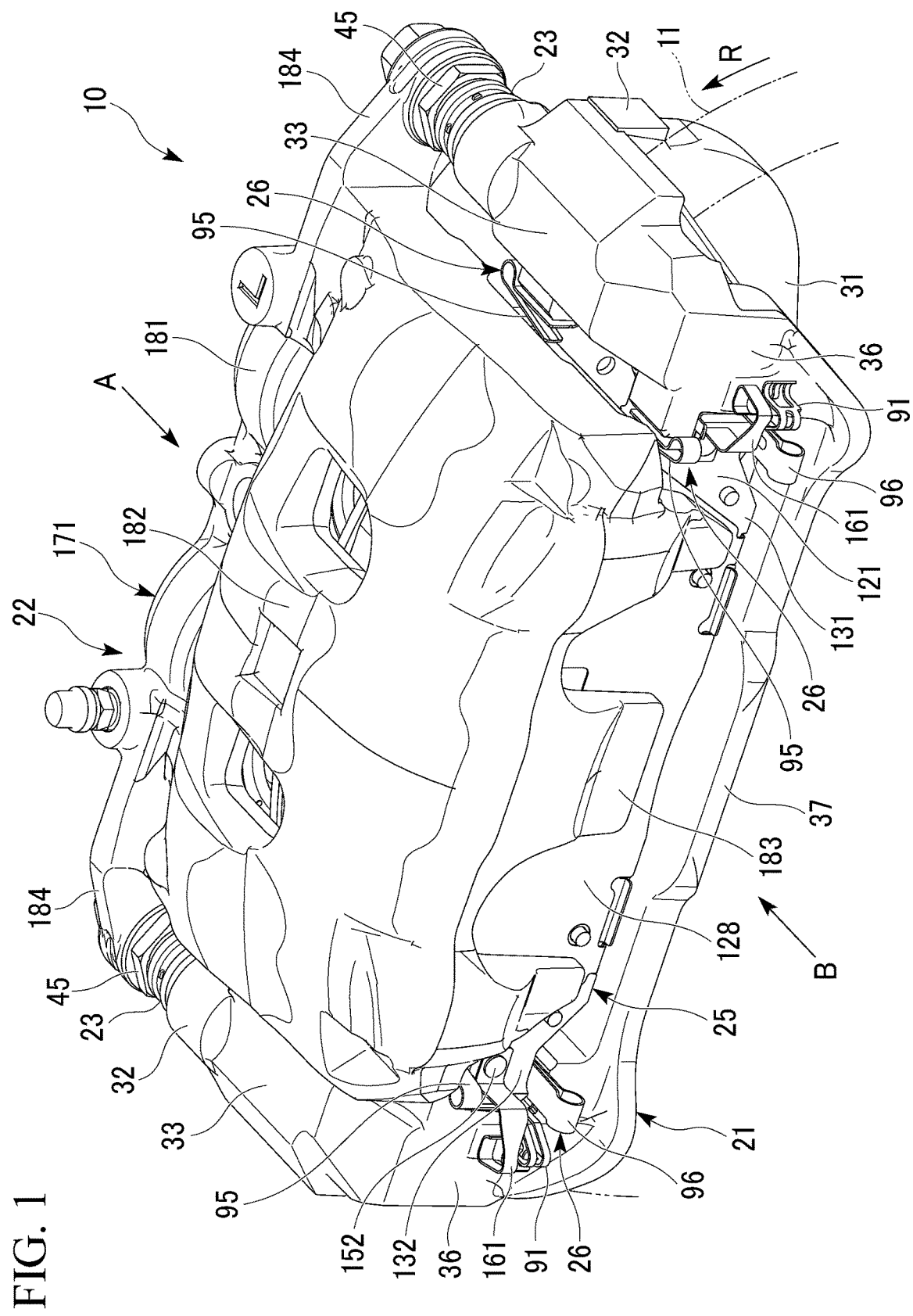
FIG. 1 is a perspective view illustrating a disc brake according to a first embodiment of the present invention.
Figure 2:
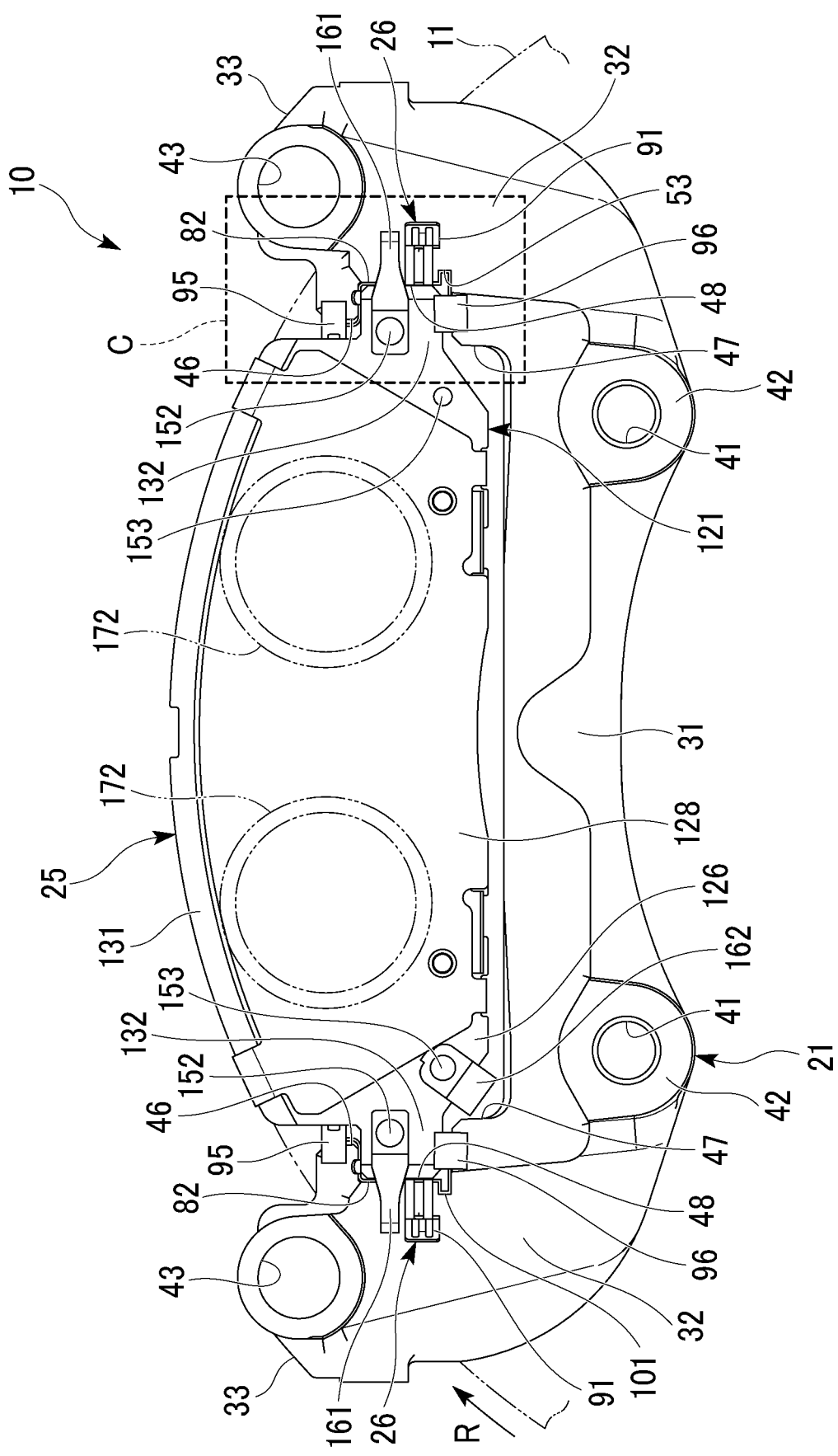
FIG. 2 is a view of the disc brake in a direction of arrow A of FIG. 1 and is a rear view excluding a caliper.
Figure 3:
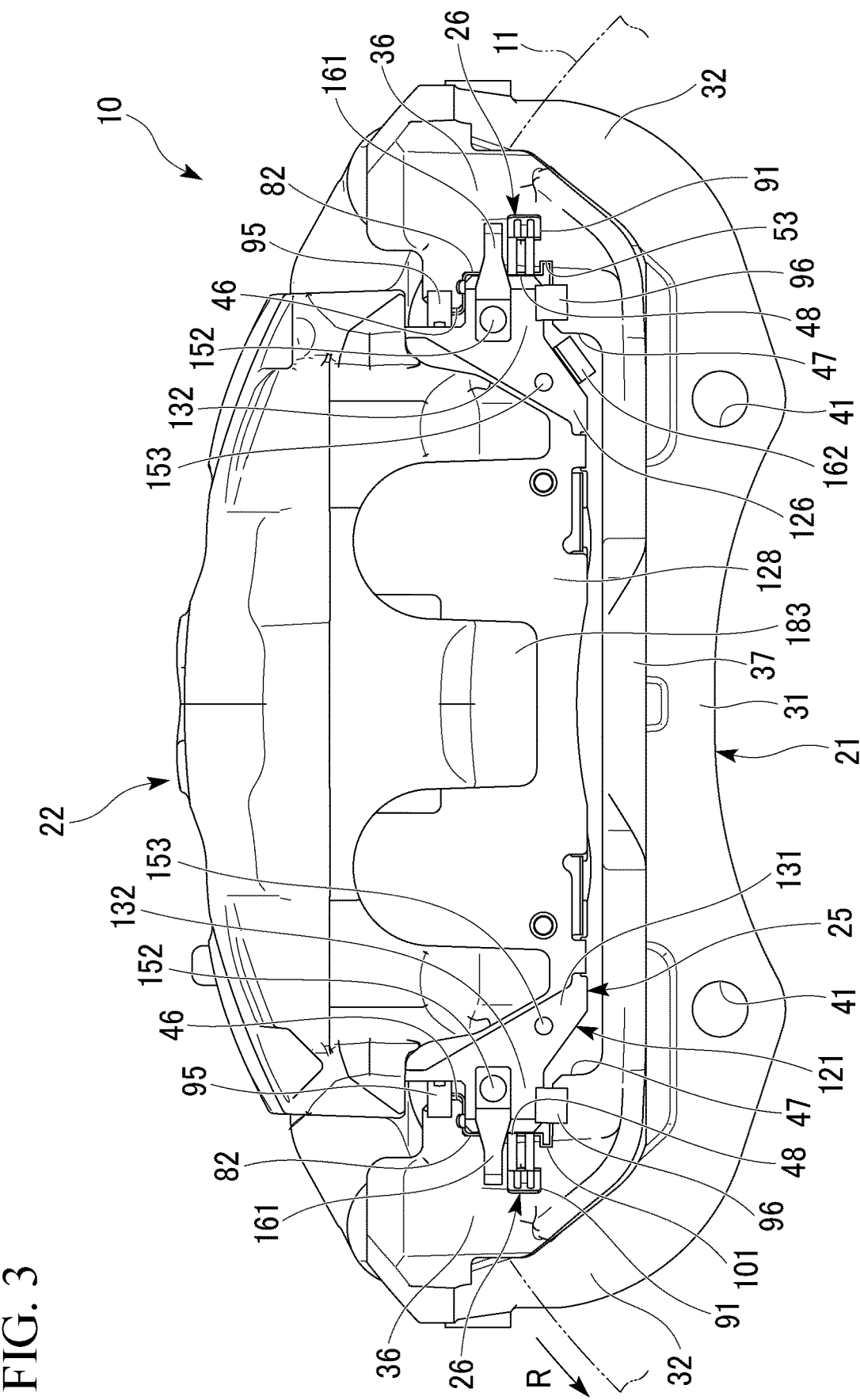
FIG. 3 is a front view of the disc brake in a direction of arrow B of FIG. 1.

A first embodiment of the present invention will be described below with reference to FIGS. 1 to 6. A disc brake 10 of the first embodiment illustrated in FIGS. 1 to 3 is for a vehicle such as an automobile, applies a braking force to the vehicle, and specifically can be used for front wheel braking of a four-wheeled vehicle. The disc brake 10 brakes traveling of a vehicle by stopping rotation of a disc-shaped disc 11 that rotates together with the wheels (not illustrated).

As illustrated in FIG. 1, the disc brake 10 includes an attachment member 21, a caliper 22, and a pair of boots 23. Also, as illustrated in FIGS. 2 and 3, the disc brake 10 includes a pair of friction pads 25 and four pad springs 26.

Hereinafter, a central axis of the disc 11 is referred to as a disc axis, a direction in which the disc axis extends is referred to as a disc axial direction, a radial direction of the disc 11 is referred to as a disc radial direction, and a circumferential direction of the disc 11, that is, a rotation direction thereof is referred to as a disc rotation direction. Also, a center side of the disc 11 in the disc radial direction is referred to as a disc radial direction inner side, and a side opposite to the center of the disc 11 in the disc radial direction is referred to as a disc radial direction outer side. Also, a center side in the disc rotation direction is referred to as a disc rotation direction inner side, and a side opposite to the center in the disc rotation direction is referred to as a disc rotation direction outer side. Also, an inlet side of the disc brake 10 into which the disc 11 enters in a disc rotation direction R when the vehicle (not illustrated) travels forward is referred to as a disc rotation direction entry side. Also, an outlet side of the disc brake 10 from which the disc 11 exits in the disc rotation direction R when the vehicle travels forward is referred to as a disc rotation direction exit side. Also, a line passing between the disc axis and a center position of a length of each of the attachment member 21 and the caliper 22 in the disc rotation direction and extending in the disc radial direction is referred to as a radial direction reference line. This radial direction reference line is perpendicular to the disc axis. Also, an outer side in a vehicle width direction of the vehicle is referred to as an outer side, and an inner side in the vehicle width direction is referred to as an inner side.

As illustrated in FIG. 2, the attachment member 21 includes an inner beam part 31, a pair of inner side torque receiving parts 32, and a pair of pin insertion parts 33. Also, as illustrated in FIG. 3, the attachment member 21 further includes a pair of outer side torque receiving parts 36 and an outer beam part 37. The attachment member 21 has a mirror-symmetrical shape with respect to a center in the disc rotation direction.

As illustrated in FIG. 1, the inner beam part 31 is attached to a non-rotating portion of the vehicle in a state of being disposed on one side with respect to the disc 11 in the disc axial direction. Here, the non-rotating portion of the vehicle to which the attachment member 21 is attached is disposed on an inner side of the disc 11. The inner beam part 31 attached to the non-rotating portion is also disposed on an inner side of the disc 11. As illustrated in FIG. 2, the inner beam part 31 is disposed to extend in the disc rotation direction. A pair of attachment boss parts 42 having attachment holes 41 in the disc axial direction are provided on both sides of the inner beam part 31 in the disc rotation direction. The inner beam part 31 is attached to the non-rotating portion of the vehicle at the pair of attachment boss parts 42.

One of the pair of inner side torque receiving parts 32 extends toward the disc radial direction outer side from an end portion on one side of the inner beam part 31 in the disc rotation direction. Also, the other of the pair of inner side torque receiving parts 32 extends toward the disc radial direction outer side from an end portion on the other side of the inner beam part 31 in the disc rotation direction. The pair of inner side torque receiving parts 32 are disposed on the inner side of the disc 11 as in the inner beam part 31.

As illustrated in FIG. 1, one of the pair of pin insertion parts 33 extends outward in the disc axial direction across an outer circumferential side of the disc 11 from an end portion on the disc radial direction outer side of the inner side torque receiving part 32 on one side in the disc rotation direction. Also, the other of the pair of pin insertion parts 33 extends outward in the disc axial direction across the outer circumferential side of the disc 11 from an end portion on the disc radial direction outer side of the inner side torque receiving part 32 on the other side in the disc rotation direction.

As illustrated in FIG. 2, pin insertion holes 43 extending in the disc axial direction are each formed in one inner side torque receiving part 32 and one pin insertion part 33 connected to the one inner side torque receiving part 32, and the other inner side torque receiving part 32 and the other pin insertion part 33 connected to the other inner side torque receiving part 32. The pair of pin insertion holes 43 are each formed from an end surface on the inner side of the inner side torque receiving part 32 to an intermediate position of the pin insertion part 33.

A pair of slide pins 45 on both sides in the disc rotation direction of the caliper 22 illustrated in FIG. 1 are slidably fitted into the pair of pin insertion holes 43 provided in the attachment member 21. Thereby, the attachment member 21 supports the caliper 22 to be slidable in the disc axial direction in the pair of pin insertion parts 33. In other words, in the caliper 22, the pair of slide pins 45 provided on both sides in the disc rotation direction are slidably fitted into the corresponding pin insertion holes 43 of the attachment member 21 illustrated in FIG. 2. Thereby, the caliper 22 illustrated in FIG. 1 is provided to be displaceable in the disc axial direction with respect to the attachment member 21.

One of the pair of outer side torque receiving parts 36 extends toward a side opposite to the inner side torque receiving part 32 of the pin insertion part 33 (that is, toward the disc radial direction inner side from an end portion thereof on the outer side) on one side in the disc rotation direction. The other of the pair of outer side torque receiving parts 36 extends toward the disc radial direction inner side from an end portion on the outer side of the pin insertion part 33 on the other side in the disc rotation direction. The pair of outer side torque receiving parts 36 are disposed on the outer side of the disc 11.

The outer beam part 37 extends in the disc rotation direction to connect end portions on the disc radial direction inner side of the pair of outer side torque receiving parts 36. The outer beam part 37 is disposed on the outer side of the disc 11 similarly to the pair of outer side torque receiving parts 36.

With the configuration described above, the attachment member 21 is attached to a non-rotating portion of the vehicle in a state of being disposed across the outer circumferential side of the disc 11. The inner beam part 31 and the pair of inner side torque receiving parts 32 are disposed on the inner side of the attachment member 21 which is the attachment side to the non-rotating portion of the vehicle. On the other hand, the pair of outer side torque receiving parts 36 and the outer beam part 37 are disposed on the outer side of the attachment member 21 which is a side opposite to the inner side.

As illustrated in FIGS. 2 and 3, pad guide parts 48 having the same recessed shape as each other are formed in the pair of inner side torque receiving parts 32 and the pair of outer side torque receiving parts 36.

That is, as illustrated in FIG. 2, the pad guide part 48 having a shape recessed toward the disc rotation direction outer side from an inner surface 46 on the disc radial direction outer side and an inner surface 47 on the disc radial direction inner side which face the disc rotation direction inner side is formed in one of the inner side torque receiving parts 32. The pad guide part 48 having a shape recessed toward the disc rotation direction outer side from the inner surface 46 on the disc radial direction outer side and the inner surface 47 on the disc radial direction inner side which face the disc rotation direction inner side is also formed in the other of the inner side torque receiving parts 32. Therefore, the recessed pad guide parts 48 recessed in a direction away from each other in the disc rotation direction are formed on sides in which the pair of inner side torque receiving parts 32 face each other. The pad guide parts 48 penetrate the inner side torque receiving part 32 in which the pad guide part 48 is formed in the disc axial direction. One of the pair of friction pads 25 is supported by the pair of pad guide parts 48 provided in the pair of inner side torque receiving parts 32. All of the inner surfaces 46 and the inner surfaces 47 extend in the disc axial direction and along the radial direction reference line.

Also, as illustrated in FIG. 3, the pad guide part 48 having a shape recessed toward the disc rotation direction outer side from an inner surface 46 on the disc radial direction outer side and an inner surface 47 on the disc radial direction inner side which face the disc rotation direction inner side is formed in one of the pair of outer side torque receiving parts 36. The pad guide part 48 having a shape recessed toward the disc rotation direction outer side from an inner surface 46 on the disc radial direction outer side and an inner surface 47 on the disc radial direction inner side which face the disc rotation direction inner side is also formed in the other of the pair of outer side torque receiving parts 36. Therefore, the recessed pad guide parts 48 recessed in a direction away from each other in the disc rotation direction are formed at portions in which the pair of outer side torque receiving parts 36 face each other. The pad guide parts 48 each penetrate the outer side torque receiving part 36 in which the pad guide part 48 is formed in the disc axial direction. The other of the pair of friction pads 25 is supported by the pair of pad guide parts 48 provided in the pair of outer side torque receiving parts 36.

Figure 4:
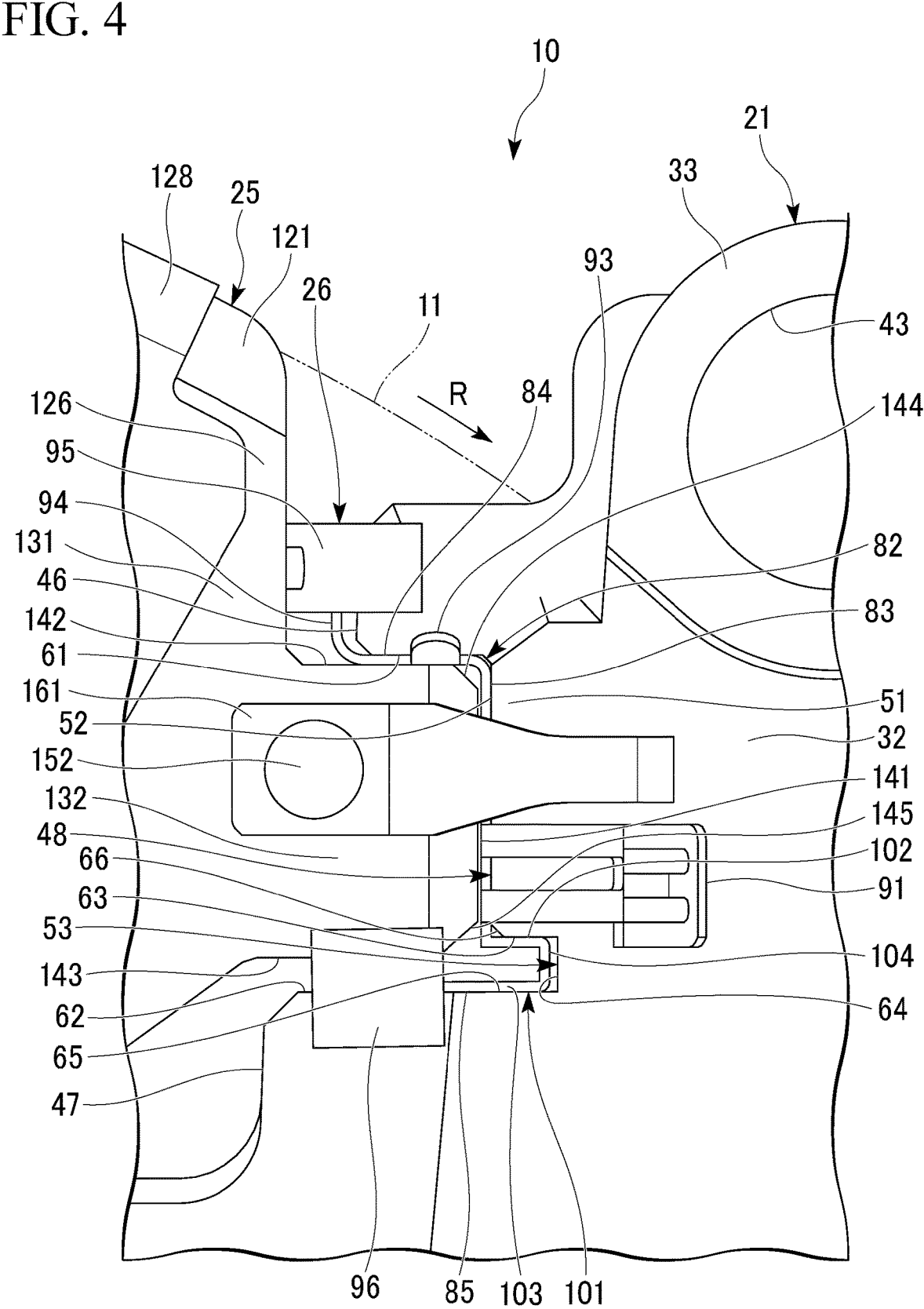
FIG. 4 is an enlarged rear view of the disc brake illustrating a part C in FIG. 2.

Therefore, the attachment member 21 includes four pad guide parts 48 having a shape recessed in the disc rotation direction. One of the four pad guide parts 48 having a common shape will be further described with reference to FIG. 4. FIG. 4 illustrates surroundings of the inner side torque receiving part 32 on the disc rotation direction exit side.

The pad guide part 48 includes a recessed part 53, that is recessed in the disc rotation direction with respect to a bottom surface 52 of a region on the disc radial direction outer side, in a region on the disc radial direction inner side of a bottom part 51 that is on a back side of the pad guide part 48 in the recessed direction. The bottom surface 52 has a planar shape facing the disc rotation direction inner side. The recessed part 53 is recessed toward the disc rotation direction outer side with respect to the bottom surface 52. The recessed part 53 also penetrates the inner side torque receiving part 32 in which the recessed part 53 is formed in the disc axial direction.

The pad guide part 48 includes a bottom surface 52, a wall surface 61 on the disc radial direction outer side and facing the disc radial direction inner side, a wall surface 62 on the disc radial direction inner side and facing the disc radial direction outer side, a side surface 63 between the wall surface 61 and the wall surface 62 in the disc radial direction and facing the disc radial direction inner side, a back bottom surface 64 on the disc rotation direction outer side with respect to the bottom surface 52 and facing the disc rotation direction inner side, a side surface 65 on the disc rotation direction outer side of the wall surface 62 and disposed on the same plane as the wall surface 62, and an inclined surface 66 connecting the bottom surface 52 and the side surface 63. All of the bottom surface 52, the wall surface 61, the wall surface 62, the side surface 63, the back bottom surface 64, the side surface 65, and the inclined surface 66 have a planar shape.

The wall surface 61 extends from an end edge portion of the bottom surface 52 on the disc radial direction outer side toward the disc rotation direction inner side. The inclined surface 66 extends from an end edge portion of the bottom surface 52 on the disc radial direction inner side toward the disc rotation direction outer side and the disc radial direction inner side. The side surface 63 extends from an end edge portion of the inclined surface 66 on a side opposite to the bottom surface 52 toward the disc rotation direction outer side. The back bottom surface 64 extends from an end edge portion of the side surface 63 on the disc rotation direction outer side toward the disc radial direction inner side. The side surface 65 extends from an end edge portion of the back bottom surface 64 on the disc radial direction inner side toward the disc rotation direction inner side to be connected to the wall surface 62. The recessed part 53 has the side surface 63, the back bottom surface 64, the side surface 65, and the inclined surface 66.

Both the bottom surface 52 and the back bottom surface 64 extend in the disc axial direction and along the radial direction reference line. The wall surface 61, the wall surface 62, the side surface 63, and the side surface 65 are each disposed in a plane perpendicular to the radial direction reference line. Therefore, the wall surface 61, the wall surface 62, the side surface 63, and the side surface 65 are parallel to each other, and the bottom surface 52 and the back bottom surface 64 are perpendicular to them. All of the wall surface 61, the wall surface 62, the side surface 63, the side surface 65, the bottom surface 52, the back bottom surface 64, and the inclined surface 66 extend in the disc axial direction. The recessed part 53 is recessed from the bottom surface 52 in a direction perpendicular to the bottom surface 52.

As illustrated in FIGS. 2 and 3, the pad springs 26 are individually attached to the pair of inner side torque receiving parts 32 and the pair of outer side torque receiving parts 36 at positions of the pad guide parts 48. That is, four pad springs 26 are attached to one attachment member 21. Here, the pad spring 26 on the inner side disposed on the disc rotation direction entry side and the pad spring 26 on the outer side disposed on the disc rotation direction exit side are common parts having the same shape. The pad spring 26 disposed on the inner side and on the disc rotation direction exit side and the pad spring 26 disposed on the outer side and on the disc rotation direction entry side are common parts having the same shape. The pad springs 26 on the inner side and the disc rotation direction entry side and on the outer side and the disc rotation direction exit side have a mirror-symmetrical shape with respect to the pad springs 26 on the inner side and the disc rotation direction exit side and on the outer side and the disc rotation direction entry side.

The pad spring 26 is formed by press forming a single plate material. One of the pad springs 26 having a mirror-symmetrical shape with respect to each other will be taken as an example and described with reference to FIGS. 5 and 6. The pad spring 26 illustrated in FIGS. 5 and 6 is one disposed on the inner side and the disc rotation direction exit side and on the outer side and the disc rotation direction entry side.

Figure 5:
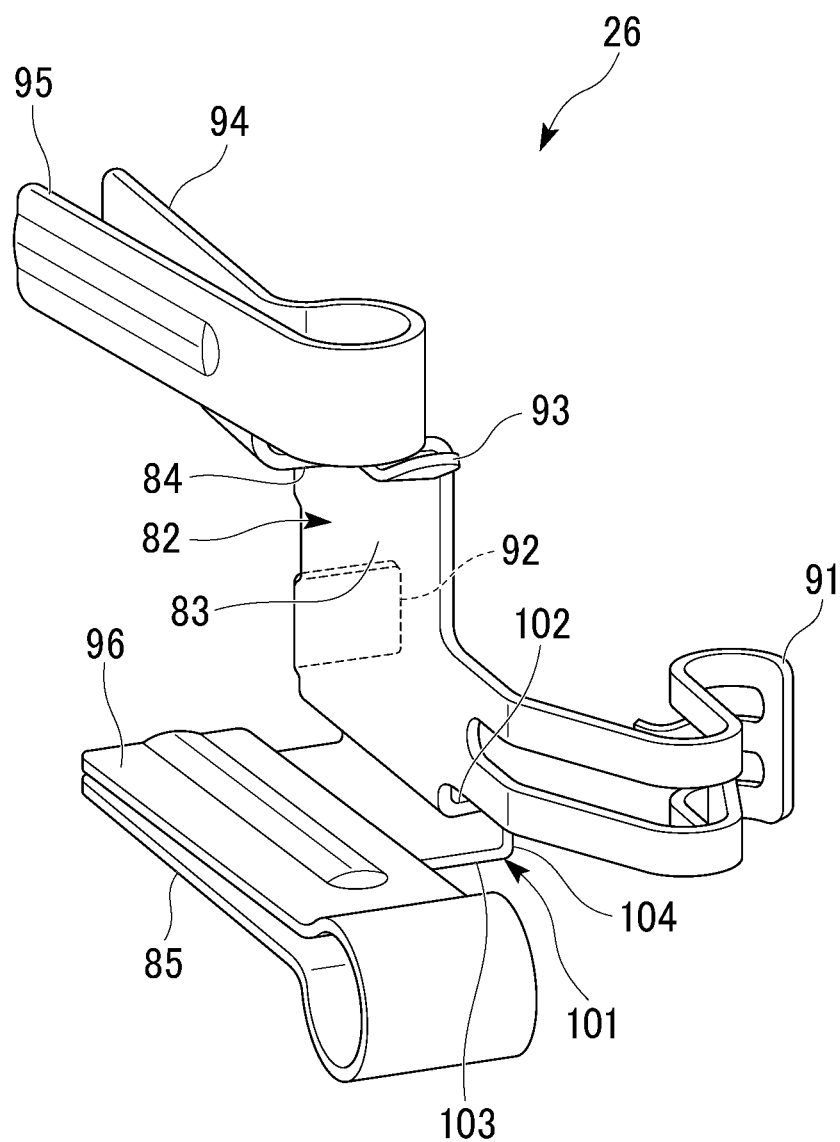
FIG. 5 is a perspective view illustrating a pad spring of the disc brake.
Figure 6:
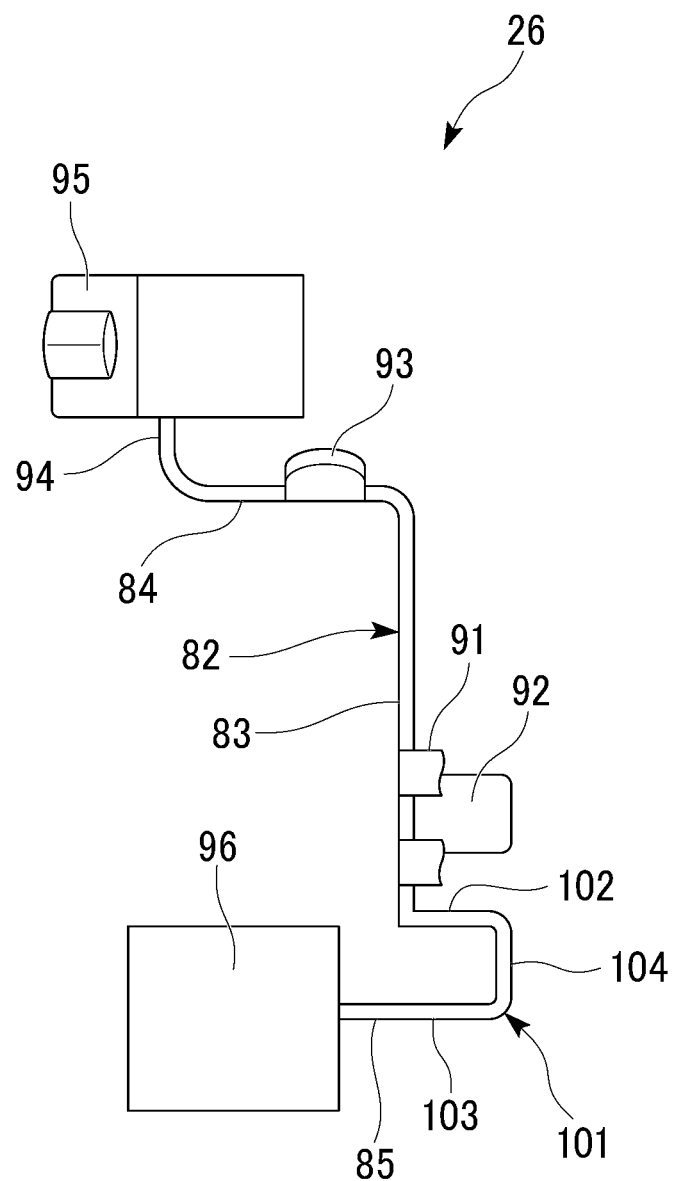
FIG. 6 is a view illustrating the pad spring of the disc brake and is a side view with a part omitted.

As illustrated in FIG. 5, the pad spring 26 includes a recessed guide part 82 and a fitting part 101 protruding from the guide part 82 to the outside of the guide part 82. The guide part 82 includes a substrate part 83 (bottom surface contact part), a plate part 84, and a plate part 85, all of which have a flat plate shape. The substrate part 83 has a rectangular shape, and the plate part 84 has a rectangular shape extending perpendicular to the substrate part 83 from one end edge portion of the substrate part 83. One end edge portion of the fitting part 101 is connected to the other end edge portion of the substrate part 83 that is parallel to the one end edge portion of the substrate part 83. The plate part 85 extends parallel to the plate part 84 from the other end edge portion of the fitting part 101 that is parallel to the one end edge portion of the fitting part 101. The plate part 85 has a rectangular shape and is disposed on the same side as the plate part 84 with respect to the substrate part 83 in a plate thickness direction of the substrate part 83.

The pad spring 26 includes an extension part 91, an engaging plate part 92, a protruding plate piece part 93, a protruding plate part 94, a spring plate part 95, and a spring plate part 96. The extension part 91 has an S shape. The extension part 91 extends in substantially a direction in which the substrate part 83 extends from a position near the fitting part 101 at one end edge portion of end edge portions perpendicular to one end edge portion of the substrate part 83 at which the plate part 84 is provided, then is folded on a side opposite to the plate parts 84 and 85 in the plate thickness direction of the substrate part 83, then is further folded on a side opposite to the plate parts 84 and 85 in the plate thickness direction of the substrate part 83, and thereby forms an S-shape. The engaging plate part 92 protrudes in an opposite direction with respect to the plate parts 84 and 85 in the thickness direction of the substrate part 83 from a position near the fitting part 101 at the other end edge portion of the end edge portions perpendicular to one end edge portion of the substrate part 83 at which the plate part 84 is provided. The protruding plate piece part 93 extends along the same plane as the plate part 84 from an end edge portion of the plate part 84 that is continuous with an end edge portion of the substrate part 83 at which the extension part 91 is provided, and then protrudes obliquely in an opposite direction with respect to the plate part 85.

The protruding plate part 94 protrudes in a direction opposite to the plate part 85 while being parallel to the substrate part 83 from an end edge portion of the plate part 84 opposite to the substrate part 83. The spring plate part 95 is folded toward a side opposite to the plate part 84 from an end edge portion of the protruding plate part 94 that is continuous with an end edge portion of the plate part 84 at which the protruding plate piece part 93 is provided. The spring plate part 96 extends along the same plane as the plate part 85 from an end edge portion of the plate part 85 that is continuous with the end edge portion of the substrate part 83 at which the extension part 91 is provided, and then is folded toward the plate part 84 side. The spring plate part 96 constitutes the recessed guide part 82 together with the substrate part 83, the plate part 84, and the plate part 85.

Further, the spring plate part 95 and the spring plate part 96 illustrated in FIGS. 5 and 6 show a deformed state when the pad spring 26 is attached to the attachment member 21 to support the friction pad 25. In a natural state, the spring plate part 95 opens to form an acute angle larger than an angle illustrated in the drawing with respect to the protruding plate part 94 with a folding point side as a center. In the natural state, the spring plate part 96 opens to form an acute angle with respect to the plate part 85 with the folding point side as a center.

The fitting part 101 has a shape that protrudes from the plate part 85 side of the guide part 82 along the plate part 85 to a side opposite to the plate part 85 with respect to the substrate part 83. The fitting part 101 includes a flat plate-shaped extension plate part 102 extending from an end edge portion of the substrate part 83 on the plate part 85 side to a side opposite to a side on which the plate parts 84 and 85 are positioned in the plate thickness direction of the substrate part 83, a flat plate-shaped extension plate part 103 extending further than a position of the substrate part 83 from the plate part 85 on the same plane as the plate part 85 toward a side opposite to the side on which the plate parts 84 and 85 are positioned in the plate thickness direction of the substrate part 83, and a flat plate-shaped connection plate part 104 connecting both end edge portions on distal end sides of the extension plate part 102 and the extension plate part 103 in the extension directions. The extension plate part 102 and the extension plate part 103 are parallel to each other, and these are perpendicular to the substrate part 83. The extension plate part 102 is parallel to the plate part 84 and the plate part 85. The extension plate part 103 is parallel to the plate part 84 and is disposed on the same plane as the plate part 85. The connection plate part 104 is perpendicular to both the extension plate part 102 and the extension plate part 103.

In other words, in a state in which the fitting part 101 is perpendicular to the substrate part 83 from the end edge portion of the substrate part 83 on the plate part 85 side and is parallel to the plate part 84 and the plate part 85, the fitting part 101 has a curl shape that extends to a side opposite to the side on which the plate parts 84 and 85 are positioned in the plate thickness direction of the substrate part 83 and then is folded toward the side on which the plate part 85 is positioned to be connected to the plate part 85 to be coplanar therewith. A distance between outer surfaces of the extension plate part 102 and the extension plate part 103 in opposite directions to each other in the disc radial direction is larger than a distance between the side surface 63 and the side surface 65 of the recessed part 53 illustrated in FIG. 4 facing each other by an amount corresponding to a predetermined tightening allowance.

The guide part 82 of each pad spring 26 is fitted to the recessed pad guide part 48 in each of the pair of inner side torque receiving parts 32 illustrated in FIG. 2 and the pair of outer side torque receiving parts 36 illustrated in FIG. 3. At that time, in each of the four pad springs 26, the fitting part 101 is fitted to the corresponding recessed part 53 while being elastically deformed in the disc radial direction like the pad spring 26 on the inner side and the disc rotation direction exit side as illustrated in FIG. 4. Therefore, the guide part 82 of each pad spring 26 comes into contact with the corresponding pad guide part 48 so that the plate part 84 comes into contact with the wall surface 61 by surface contact, the substrate part 83 comes into contact with the bottom surface 52 by surface contact, and the plate part 85 comes into contact with the wall surface 62 by surface contact. Also, the fitting part 101 of each pad spring 26 is configured such that the extension plate part 102 comes into contact with the side surface 63 by surface contact, and the extension plate part 103 comes into contact with the side surface 65 by surface contact. In other words, each guide part 82 of each pad springs 26 elastically fits into the corresponding pad guide part 48, and at that time, each fitting part 101 elastically fits into the corresponding recessed part 53. In this state, the fitting part 101 is separated from the back bottom surface 64 of the recessed part 53.

Therefore, the guide part 82 of the pad spring 26 is provided to be able to come into contact with the wall surface 61 on the disc radial direction outer side and the bottom surface 52 on the back side in the recessed direction in the pad guide part 48 having the corresponding recessed shape. Also, the fitting part 101 of the pad spring 26 protrudes in the disc rotation direction from an end portion of the guide part 82 on the disc radial direction inner side and is elastically fitted into the recessed part 53 at an end portion of the pad guide part 48 on the disc radial direction inner side. The fitting part 101 is elastically deformed in the disc radial direction to be fitted into the recessed part 53 in this way and thereby applies an elastic force to the side surface 63 on the disc radial direction outer side and the side surface 65 on the disc radial direction inner side of the recessed part 53.

Also, when the guide part 82 of each pad spring 26 is fitted to the recessed pad guide part 48 in each of the pair of inner side torque receiving parts 32 and the pair of outer side torque receiving parts 36, in the pad spring 26 attached to the inner side torque receiving part 32, the inner side torque receiving part 32 is sandwiched by the extension part 91 and the engaging plate part 92 in the disc axial direction. Also, in the pad spring 26 attached to the outer side torque receiving part 36, the outer side torque receiving part 36 is sandwiched by the extension part 91 and the engaging plate part 92 in the disc axial direction.

At that time, as illustrated in FIG. 2, both the two pad springs 26 attached to the pair of inner side torque receiving parts 32 are attached in a state in which the extension part 91 is disposed on the inner side in the disc axial direction, that is, on a side opposite to the disc 11. As illustrated in FIG. 3, both the two pad springs 26 attached to the pair of outer side torque receiving parts 36 are attached in a state in which the extension part 91 is disposed on the outer side in the disc axial direction, that is, on a side opposite to the disc 11.

As illustrated in FIG. 4, in the pad spring 26 in a state of being attached to the pad guide part 48, the fitting part 101 thereof protrudes perpendicular to the radial direction reference line and toward the disc rotation direction outer side from the end portion of the guide part 82 on the disc radial direction inner side, and furthermore, is elastically fitted into the recessed part 53 that is similarly recessed at the end portion of the pad guide part 48 on the disc radial direction inner side. The extension plate part 102 of the fitting part 101 extends perpendicular to the radial direction reference line and toward the disc rotation direction outer side from an end edge portion of the substrate part 83 on the disc radial direction inner side. Also, the extension plate part 103 extends perpendicular to the radial direction reference line and toward the disc rotation direction outer side from an end edge portion of the plate part 85 on the disc rotation direction outer side to be coplanar with the plate part 85. Also, the connection plate part 104 of the fitting part 101 connects both end edge portions of the extension plate part 102 and the extension plate part 103 on the disc rotation direction outer side in a direction perpendicular to them.

In other words, the fitting part 101 has a curl shape that extends perpendicular to the radial direction reference line and toward the disc rotation direction outer side from an end edge portion of the substrate part 83 of the guide part 82 on the disc radial direction inner side, then is folded toward the disc radial direction inner side, and is connected to the plate part 85 to be coplanar therewith. The fitting part 101 protrudes to the disc rotation direction outer side to be perpendicular to the substrate part 83 that is able to come into contact with the bottom surface 52 of the guide part 82. The fitting part 101 is provided at the end portion of the guide part 82 on the disc radial direction inner side.

The pair of friction pads 25 illustrated in FIGS. 2 and 3 are common parts. The friction pad 25 has a back plate 121 made of a metal and a lining (not illustrated) which is a friction material. The lining is attach to one side of the back plate 121 in a plate thickness direction. A shim 128 is provided on a pressing surface 126 on a side opposite to the lining in the plate thickness direction of the back plate 121 to cover the pressing surface 126. The shim 128 is engaged with the back plate 121.

The pair of friction pads 25 are supported by the attachment member 21 via the pad spring 26 on the back plate 121. The pair of friction pads 25 each face the disc 11 on the lining. Therefore, the linings of the friction pads 25 come into contact with the disc 11. The pressing surface 126 of the back plate 121 faces a side opposite to a side in which the disc 11 is positioned in the disc axial direction.

The back plate 121 has a mirror-symmetrical shape and includes a main plate part 131 to which the lining is attached, and protruding parts 132 protruding outward in a longitudinal direction of the main plate part 131 from both end portions of the main plate part 131 in the longitudinal direction. The pair of protruding parts 132 have a substantially rectangular shape and each include a distal end surface part 141, a surface part 142, a surface part 143, a chamfered edge 144, and a chamfered edge 145 as illustrated in FIG. 4. All of the distal end surface part 141, the surface part 142, the surface part 143, the chamfered edge 144, and the chamfered edge 145 have a planar shape and extend in a thickness direction of the back plate 121. The surface part 142 and the surface part 143 are parallel to each other and perpendicular to the distal end surface part 141. The chamfered edge 144 obliquely connects the distal end surface part 141 and the surface part 142 to form an equivalent angle with respect to them. The chamfered edge 145 obliquely connects the distal end surface part 141 and the surface part 143 to form an equivalent angle with respect to them.

As illustrated in FIG. 2, in the inner friction pad 25, the pair of protruding parts 132 are inserted into the guide parts 82 of the pair of pad springs 26 attached to the pair of inner side torque receiving parts 32. At that time, the back plate 121 elastically deforms the pair of spring plate parts 95 and the pair of spring plate parts 96 provided on both sides in the disc rotation direction. The inner friction pad 25 attached to the attachment member 21 via the pair of pad springs 26 in this way is movable in the disc axial direction with respect to the attachment member 21 in a state in which it is positioned on one surface side of the disc 11. Each of the pad springs 26 is attached to the attachment member 21 to elastically support the corresponding friction pad 25.

In the recessed pad guide parts 48 of the pair of inner side torque receiving parts 32, the pair of protruding parts 132 of the inner friction pad 25 are disposed in a nested state via the guide parts 82 of the pair of pad springs 26. Therefore, the pad guide parts 48 of the pair of inner side torque receiving parts 32 limit movement of the pair of protruding parts 132 provided in the inner friction pad 25 in the disc radial direction. Also, the pad guide part 48 of the inner side torque receiving part 32 receives a braking torque in the disc rotation direction from the protruding part 132 of the inner friction pad 25 via the guide part 82.

In other words, in the inner friction pad 25, one protruding part 132 of the back plate 121 thereof is disposed in the pad guide part 48 of one inner side torque receiving part 32 via the guide part 82 of the corresponding pad spring 26. Also, the other protruding part 132 of the back plate 121 is disposed in the pad guide part 48 of the other inner side torque receiving part 32 via the guide part 82 of the corresponding pad spring 26. Thereby, the inner friction pad 25 is movably supported with respect to the attachment member 21 in the disc axial direction.

In addition, in the inner friction pad 25, the protruding parts 132 on both sides of the back plate 121 thereof are each pressed toward the disc radial direction outer side by the spring plate part 96 of the pad spring 26 with which each of the protruding parts 132 comes into contact. Thereby, as illustrated in FIG. 4, the surface part 142 of the protruding part 132 on both sides of the inner friction pad 25 comes into contact with the plate part 84 of the guide part 82 of the pad spring 26 by surface contact. Here, basically, the distal end surface part 141 of the protruding part 132 on both sides of the inner friction pad 25 comes into contact with the substrate part 83 of the guide part 82 of the pad spring 26 to be fitted by surface contact. In addition, the main plate part 131 of the back plate 121 of the inner friction pad 25 is biased toward a center side in the disc rotation direction by the spring plate parts 95 of the pair of pad springs 26 with which the main plate part 131 comes into contact.

Therefore, the guide part 82 of each of the pad springs 26 disposed on both sides in the disc rotation direction on the inner side is provided to be able to come into contact with the wall surface 61 and the bottom surface 52 on the disc radial direction outer side in the pad guide part 48 to be fitted and guides movement of the corresponding protruding part 132 of the inner friction pad 25 in the disc axial direction. When the inner friction pad 25 is in a state in which the surface part 142 of the protruding part 132 on both sides thereof comes into contact with the plate part 84 of the guide part 82 of the pad spring 26 by surface contact, the protruding part 132 is separated from the fitting part 101 in the disc radial direction and the disc rotation direction and does not come into contact with the fitting part 101 at all.

In the outer friction pad 25, as illustrated in FIG. 3, the pair of protruding parts 132 are inserted into the guide parts 82 of the pair of pad springs 26 attached to the pair of outer side torque receiving parts 36. At that time, the back plate 121 elastically deforms the pair of spring plate parts 95 and the pair of spring plate parts 96 provided on both sides in the disc rotation direction. The outer friction pad 25 attached to the attachment member 21 via the pair of pad springs 26 in this way is movable in the disc axial direction with respect to the attachment member 21 in a state in which it is positioned on the other surface side of the disc 11. Each of the pad springs 26 is attached to the attachment member 21 to elastically support the corresponding friction pad 25.

In the recessed pad guide parts 48 of the pair of outer side torque receiving parts 36, the pair of protruding parts 132 of the outer friction pad 25 are disposed in a nested state via the guide parts 82 of the pair of pad springs 26. Therefore, the pad guide parts 48 of the outer side torque receiving parts 36 limit movement of the pair of protruding parts 132 provided on the outer friction pad 25 in the disc radial direction. Also, the pad guide part 48 of the outer side torque receiving part 36 receives a braking torque in the disc rotation direction from the protruding part 132 of the outer friction pad 25 via the guide part 82.

In other words, in the outer friction pad 25, one protruding part 132 of the back plate 121 thereof is disposed in the pad guide part 48 of one outer side torque receiving part 36 via the guide part 82 of the corresponding pad spring 26. Also, the other protruding part 132 of the back plate 121 is disposed in the pad guide part 48 of the other outer side torque receiving part 36 via the guide part 82 of the corresponding pad spring 26. Thereby, the outer friction pad 25 is movably supported with respect to the attachment member 21 in the disc axial direction.

In addition, the outer friction pad 25 is supported by the pair of pad guide parts 48 on the outer side, which are the same as the pair of pad guide parts 48 on the inner side, via the pair of pad springs 26 on the outer side, which are the same as the pair of pad springs 26 on the inner side, in the same manner as the inner friction pad 25.

As described above, as illustrated in FIG. 2, the attachment member 21 includes the inner side torque receiving parts 32 formed on the disc rotation direction entry side and the disc rotation direction exit side to receive a braking torque of the inner friction pad 25. Also, as illustrated in FIG. 3, the attachment member 21 includes the outer side torque receiving parts 36 formed on the disc rotation direction entry side and the disc rotation direction exit side to receive a braking torque of the outer friction pad 25.

The back plate 121 includes a pair of spring attachment protruding parts 152 and a pair of sensor attachment protruding parts 153 on the pressing surface 126 side. All of these protrude from the pressing surface 126 in a thickness direction of the back plate 121. The pair of spring attachment protruding parts 152 are provided on the protruding parts 132 on both sides. The pair of sensor attachment protruding parts 153 are provided on the main plate part 131 to be separated from each other in the disc rotation direction.

As illustrated in FIG. 2, spring materials 161 each coming into contact with corresponding one of the pair of inner side torque receiving parts 32 and biasing the inner friction pad 25 in a direction away from the disc 11 is attached to the inner friction pad 25 on both sides in the disc rotation direction. One of the spring materials 161 is attached to the spring attachment protruding part 152 of the inner friction pad 25 on the disc rotation direction entry side by swaging the spring attachment protruding part 152. The other of the spring materials 161 is attached to the spring attachment protruding part 152 of the inner friction pad 25 on the disc rotation direction exit side by swaging the spring attachment protruding part 152. Also, on the inner friction pad 25, a wear sensor 162 that comes into contact with the disc 11 and makes a warning sound when a thickness of the lining is reduced to be equal to or less than a predetermined thickness is attached to the sensor attachment protruding part 153 on the disc rotation direction entry side by swaging the sensor attachment protruding part 153.

As illustrated in FIG. 3, the spring materials 161 each coming into contact with corresponding one of the pair of outer side torque receiving parts 36 and biasing the outer friction pad 25 in a direction away from the disc 11 is also attached to the outer friction pad 25 on both sides in the disc rotation direction. One of the spring materials 161 is attached to the spring attachment protruding part 152 of the outer friction pad 25 on the disc rotation direction entry side by swaging the spring attachment protruding part 152. The other of the spring materials 161 is attached to the spring attachment protruding part 152 of the inner friction pad 25 on the disc rotation direction exit side by swaging the spring attachment protruding part 152.

As illustrated in FIG. 1, the caliper 22 has a substantially mirror-symmetrical shape. The caliper 22 includes a caliper body 171 and a piston 172 illustrated by a two-dot dashed line in FIG. 2.

The caliper body 171 includes a cylinder part 181 that is integrally formed by casting and is disposed on the inner side in the disc axial direction with respect to the disc 11, a bridge part 182 extending outward in the disc axial direction to straddle a circumference of the disc 11 from the disc radial direction outer side of the cylinder part 181, a pressing claw 183 extending to the disc radial direction inner side from a side of the bridge part 182 opposite to the cylinder part 181 and disposed on the outer side of the disc 11 in the disc axial direction, and a pair of pin attachment parts 184 extending from the cylinder part 181 to both sides in the disc rotation direction.

The caliper body 171 includes a slide pin 45 attached to the pin attachment part 184 on one side in the disc rotation direction. Also, the slide pin 45 is also attached to the pin attachment part 184 on the other side in the disc rotation direction. The pair of slide pins 45 on both sides in the disc rotation direction of the caliper 22 illustrated in FIG. 1 are slidably fitted into the pair of pin insertion holes 43 illustrated in FIG. 2. The pair of boots 23 each cover a portion of the corresponding slide pin 45 that protrudes from the attachment member 21.

The piston 172 illustrated by a two-dot dashed line in FIG. 2 is housed in the cylinder part 181 to be movable in the disc axial direction. The pair of pistons 172 have the same shape as each other and are provided to be aligned in the disc rotation direction with their positions aligned in the disc radial direction.

In the disc brake 10, a brake fluid is introduced into the cylinder part 181 of the caliper 22 via a brake pipe (not illustrated). Then, a brake hydraulic pressure acts on the pair of pistons 172 in the cylinder part 181. As a result, the pair of pistons 172 move forward to the disc 11 side and press the inner friction pad 25 disposed between the pistons 172 and the disc 11 toward the disc 11. Then, in the inner friction pad 25, the pair of protruding parts 132 are guided by the pair of pad guide parts 48 on the inner side via the guide parts 82 of the pair of pad springs 26 on the inner side, move in the disc axial direction, and come into contact with the disc 11 on the lining (not illustrated). Then, the inner friction pad 25 tries to move to the disc rotation direction exit side together with the disc 11, and the protruding part 132 on the disc rotation direction exit side hits the bottom part 51 of the pad guide part 48 on the inner side and the disc rotation direction exit side via the substrate part 83 of the guide part 82 of the pad spring 26 on the inner side and the disc rotation direction exit side. Thereby, the braking torque of the inner friction pad 25 is transmitted from the protruding part 132 on the disc rotation direction exit side to the bottom part 51 on the inner side and the disc rotation direction exit side via the substrate part 83 on the inner side and the disc rotation direction exit side.

Also, due to a reaction force of this pressing, the caliper body 171 slides the slide pin 45 with respect to the attachment member 21 and moves it in the disc axial direction. As a result, the pressing claw 183 presses the outer friction pad 25 disposed between the pressing claw 183 and the disc 11 toward the disc 11. Then, in the outer friction pad 25, the pair of protruding parts 132 are guided by the pair of pad guide parts 48 on the outer side via the guide parts 82 of the pair of pad springs 26 on the outer side and are moved in the disc axial direction to be brought into contact with the disc 11 on the lining. Then, the outer friction pad 25 tries to move to the disc rotation direction exit side together with the disc 11. As a result, the protruding part 132 on the disc rotation direction exit side hits the bottom part 51 of the pad guide part 48 on the outer side and the disc rotation direction exit side via the substrate part 83 of the guide part 82 of the pad spring 26 on the outer side and the disc rotation direction exit side. Thereby, the braking torque of the outer friction pad 25 is transmitted from the protruding part 132 on the disc rotation direction exit side to the bottom part 51 on the outer side and the disc rotation direction exit side via the substrate part 83 on the outer side and the disc rotation direction exit side.

In this way, the caliper 22 slidably provided to the attachment member 21 sandwiches the pair of friction pads 25 with the pistons 172 and the pressing claw 183 from both sides in the disc axial direction and presses the friction pads 25 against both sides of the disc 11 by the operation of the plurality of pistons 172. As a result, the caliper 22 applies frictional resistance to the disc 11 to generate a braking force. The caliper 22 is a so-called first type (slide type) caliper.

The above-described Patent Documents 1 and 2 describe that a friction pad is biased by a pad spring in a disc brake having a structure in which a protruding part of the friction pad is supported by being inserted into a recessed pad guide part of an attachment member. In the disc brake described in Patent Document 2, a curl part is provided at a position outside in the disc axial direction with respect to the attachment member of the pad spring.

As described above, in the disc brake, it is desired to suppress a slight-pressure squeal which is a brake squeal generated at the time of slight-pressure braking. Since a pressing force due to the piston 172 is small during the slight-pressure braking, the frictional force generated between the disc 11 and the friction pad 25 is also small. Therefore, the force with which the friction pad 25 comes into contact with the pad spring 26 in the disc rotation direction is small. Here, in the pad spring 26, basically, the substrate part 83 of the guide part 82 is sandwiched between the protruding part 132 of the friction pad 25 and the bottom part 51 of the pad guide part 48. However, when there is a minute gap due to variations or the like in assembling the pad spring 26 between the substrate part 83 and the protruding part 132 or between the substrate part 83 and the bottom part 51, in a pad spring having a structure that does not have the fitting part 101, bending occurs and the friction pad 25 is in a state of being supported by a relatively weak spring. Therefore, the friction pad 25 tends to vibrate due to frictional vibrations, and this may lead to a slight-pressure squeal.

That is, on the disc radial direction outer side of the pad spring 26, there is the spring plate part 95 that biases the friction pad 25 in the disc rotation direction, and the friction pad 25 is kept at a neutral position due to the spring plate part 95 of the pad spring 26 that is on both sides in the disc rotation direction. At the time of braking, the frictional force on the disc 11 tries to displace the friction pad 25 to the disc rotation direction exit side, but the spring plate part 95 generates a reaction force according to the displacement to resist the displacement. Since the frictional force is small during the slight-pressure braking, the force acting on the pad guide part 48 of the pad spring 26 from the friction pad 25 is small. The pad spring 26 is attached to the attachment member 21 while sandwiching the attachment member 21 with the extension part 91 and the engaging plate part 92 that are relatively on the disc radial direction inner side. Therefore, this attachment position and a position of a force point acting on the spring plate part 95 are deviated in the disc radial direction. Therefore, a moment centered on a line along the disc axis acts on the pad spring 26. Thereby, in the pad spring 26, a portion of the guide part 82 on the disc radial direction inner side tries to rise upward to the disc rotation direction inner side during the slight-pressure braking.

Due to the small acting force from the friction pad 25 and the above-described rising due to the moment, if the pad spring 26 does not have the fitting part 101, the friction pad 25 cannot be rigidly brought into contact with the attachment member 21 via the pad spring 26 during the slight-pressure braking. Thereby, as a vibration system, the friction pad 25 is in a state of being supported by a relatively weak spring, and there is a likelihood that a slight-pressure squeal will occur.

On the other hand, in the disc brake 10 of the present first embodiment, the pad guide part 48 having a shape recessed in the disc rotation direction of the attachment member 21 includes the recessed part 53, that is recessed in the disc rotation direction with respect to the bottom surface 52 in a region on the disc radial direction outer side, in a region of the bottom part 51 of the pad guide part 48 on the disc radial direction inner side. Then, the pad spring 26 includes the fitting part 101 that protrudes in the disc rotation direction from the guide part 82, that is provided to be able to come into contact with the wall surface 61 and the bottom surface 52 of the pad guide part 48 on the disc radial direction outer side and guides movement of the protruding part 132 of the friction pad 25 in the disc axial direction, and elastically fits into the recessed part 53.

Since the fitting part 101 is elastically fitted into the recessed part 53 in this way, movement of the fitting part 101 in a pull-out direction from the recessed part 53 is restricted by the frictional force. Therefore, the portion of the guide part 82 of the pad spring 26 on the disc radial direction inner side trying to rise upward to the disc rotation direction inner side can be suppressed. Therefore, a slight-pressure squeal caused by such rising up of the guide part 82 of the pad spring 26 can be suppressed. That is, since the protruding part 132 of the friction pad 25, the guide part 82 of the pad spring 26, and the pad guide part 48 of the attachment member 21 are in close contact with each other to increase the contact rigidity, and as a result, the support of the friction pad 25 is made rigid, the slight-pressure squeal due to vibration of the friction pad 25 can be suppressed.

Also, the fitting part 101 has a curl shape that extends in the disc rotation direction from the substrate part 83 of the guide part 82 and then is folded toward the disc radial direction inner side. Then, the fitting part 101 is elastically deformed in the disc radial direction and fitted into the recessed part 53 to apply an elastic force to the side surface 63 on the disc radial direction outer side and the side surface 65 on the disc radial direction inner side of the recessed part 53. Therefore, the slight-pressure squeal caused by the rising up of the guide part 82 of the pad spring 26 can be suppressed with a simple structure.

Also, since the fitting part 101 has a curl shape that extends in the disc rotation direction from the guide part 82 and then is folded toward the disc radial direction inner side, abrasion powder generated due to braking can be released. Therefore, deterioration in sliding performance of the friction pad 25 can be suppressed, and dragging and the brake squeal of the friction pad 25 caused by that can be suppressed. That is, properties of the substrate part 83 of the guide part 82 affect the sliding performance of the friction pad 25 in the disc axial direction. In the friction pad 25 in which braking has been repeated, the abrasion powder tends to adhere to the substrate part 83 of the guide part 82 on the disc rotation direction exit side. When the abrasion powder adheres to the substrate part 83, the sliding performance deteriorates. On the other hand, since the abrasion powder can be released into the fitting part 101 when the curl-shaped fitting part 101 is provided, the abrasion powder adhering to the substrate part 83 can be suppressed. Therefore, deterioration in sliding performance of the friction pad 25 can be suppressed.

Also, since the curl-shaped fitting part 101 is provided at the end portion of the guide part 82 on the disc radial direction inner side, contact between the fitting part 101 and the friction pad 25 can be suppressed. Therefore, the slight-pressure squeal can be further suppressed. That is, since the fitting part 101 has a curl shape, when the friction pad 25 comes into contact with the fitting part 101, due to a slight change in curvature of the curl shape of the fitting part 101, the friction pad 25 and the pad spring 26 do not come into surface contact with each other, but becomes a local hit, and the contact rigidity decreases, which causes the slight-pressure squeal. On the other hand, since the contact between the curl-shaped fitting part 101 and the friction pad 25 can be suppressed, the friction pad 25 and the pad spring 26 locally hitting each other can be suppressed.

Also, since the curl-shaped fitting part 101 is provided at the end portion of the guide part 82 on the disc radial direction inner side, the above-described abrasion powder can be efficiently discharged. That is, during rotation of the disc 11, a circumferential velocity on an outer circumferential side of the disc 11 is high, and a circumferential velocity on an inner circumferential side thereof is low. Therefore, in the guide part 82, the abrasion powder tends to accumulate on the disc radial direction inner side. Since the curl-shaped fitting part 101 is provided at the end portion of the guide part 82 on the disc radial direction inner side, the above-described abrasion powder can be efficiently discharged. Of the lining components of the friction pad 25, when a relatively hard and large abrasive component is peeled off and is caught between the guide part 82 and the friction pad 25, the contact rigidity therebetween decreases and this may lead to a brake squeal. When the abrasive component is discharged from the curl-shaped fitting part 101, decrease in contact rigidity can be suppressed.

Also, the recessed part 53 of the pad guide part 48 is recessed perpendicular to the bottom surface 52 of the pad guide part 48, and the fitting part 101 of the pad spring 26 protrudes perpendicular to the substrate part 83 that is able to come into contact with the bottom surface 52. Therefore, formation of the recessed part 53 in the attachment member 21 and formation of the fitting part 101 in the pad spring 26 are facilitated.

Second Embodiment

Figure 7:
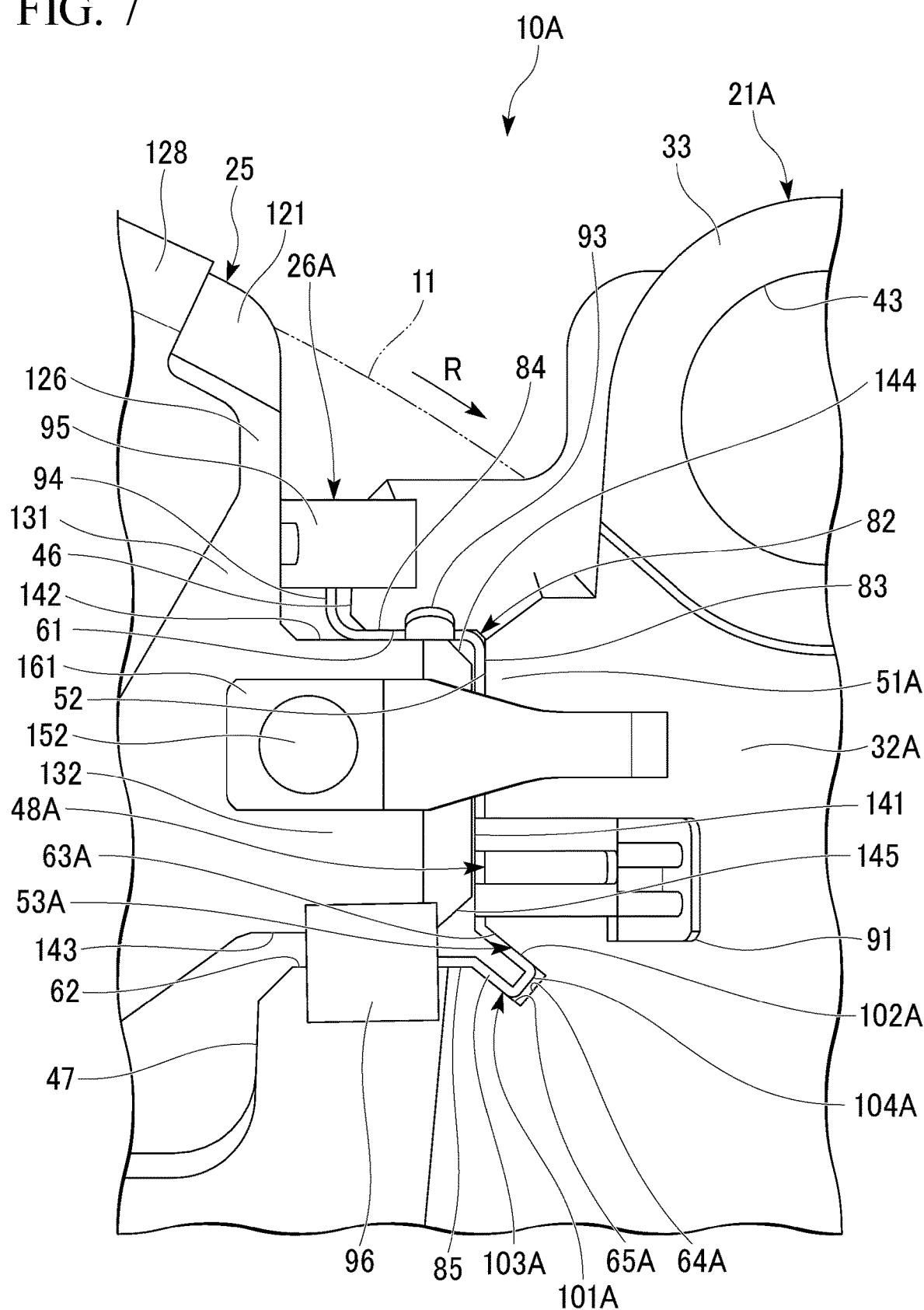
FIG. 7 is a view illustrating a main part of a disc brake according to a second embodiment of the present invention and is an enlarged rear view corresponding to FIG. 4.

Next, a second embodiment of the present invention will be described mainly on the basis of FIG. 7. In the following description, differences from the first embodiment will be mainly described. Portions common to those in the first embodiment will be denoted by the same terms and the same reference signs.

A disc brake 10A of the second embodiment includes an attachment member 21A that is partially different from the attachment member 21 of the first embodiment. FIG. 7 illustrates an inner side torque receiving part 32A on a disc rotation direction exit side. The inner side torque receiving part 32A is partially different from the above-described inner side torque receiving part 32 of the first embodiment. The inner side torque receiving part 32A includes a pad guide part 48A that is partially changed from the pad guide part 48 of the first embodiment. Further, in the attachment member 21A of the present second embodiment, the pad guide parts 48 for the inner side torque receiving parts 32 on the disc rotation direction entry side (see FIG. 2), the outer side torque receiving parts 36 on the disc rotation direction exit side (see FIG. 3), and the outer side torque receiving parts 36 on the disc rotation direction entry side (see FIG. 3) in the attachment member 21 of the above-described first embodiment have been each changed as that in the inner side torque receiving part 32 on the disc rotation direction exit side.

The pad guide part 48A includes a recessed part 53A, that is recessed in a disc rotation direction with respect to a bottom surface 52 of a region on a disc radial direction outer side, in a region on a disc radial direction inner side of a bottom part 51A that is on a back side of the pad guide part 48A in the recessed direction. The recessed part 53A is recessed to a disc rotation direction outer side with respect to the bottom surface 52. The recessed part 53A also penetrates the inner side torque receiving part 32A in which the recessed part 53A is formed in a disc axial direction.

The pad guide part 48A includes a planar-shaped side surface 63A between a wall surface 61 and a wall surface 62 in a disc radial direction and facing the disc radial direction inner side, a planar-shaped back bottom surface 64A on the disc rotation direction outer side with respect to the bottom surface 52 and facing the disc rotation direction inner side, and a planar-shaped side surface 65A on the disc rotation direction outer side of the wall surface 62 and extending to be inclined from the wall surface 62.

The side surface 63A extends from an end edge portion of the bottom surface 52 on the disc radial direction inner side to the disc rotation direction outer side at an obtuse angle of 135° with respect to the bottom surface 52. The back bottom surface 64A extends toward the disc radial direction inner side from an end edge portion of the side surface 63A on disc rotation direction outer side to be perpendicular to the side surface 63A. The side surface 65A extends toward the disc rotation direction inner side from an end edge portion of the back bottom surface 64A on the disc radial direction inner side to be perpendicular to the back bottom surface 64A and is connected to the wall surface 62 at an obtuse angle of 135°. The recessed part 53A includes the side surface 63A, the back bottom surface 64A, and the side surface 65A.

The side surface 63A, the back bottom surface 64A, and the side surface 65A extend in the disc axial direction and are inclined with respect to a radial direction reference line. The side surface 63A and the side surface 65A are inclined so that they are positioned further toward the disc rotation direction outer side toward a center side of the disc 11 in the extension direction thereof with respect to the radial direction reference line. The back bottom surface 64A is inclined so that it is positioned further toward the disc rotation direction inner side toward the center side of the disc 11 in the extension direction thereof with respect to the radial direction reference line. The side surface 63A and the side surface 65A are parallel to each other, and the back bottom surface 64A is perpendicular to them. The recessed part 53A is recessed to be inclined with respect to the bottom surface 52. The recessed part 53A is recessed to be inclined with respect to the bottom surface 52 so that it is positioned further toward the center side of the disc 11 in an extension direction of the radial direction reference line toward the disc rotation direction outer side and the disc rotation direction outer side.

The disc brake 10A of the present second embodiment includes a pad spring 26A, that is partially changed from the pad spring 26 of the above-described first embodiment, provided on an inner side and a disc rotation direction exit side. In the disc brake 10A of the present second embodiment, the same change as that in the pad spring 26 on the inner side and the disc rotation direction exit side has been made also for the pad spring 26 on the inner side and the disc rotation direction entry side, the pad spring 26 on the outer side and the disc rotation direction exit side, and the pad spring 26 on the outer side and the disc rotation direction entry side of the above-described first embodiment.

The pad spring 26A is formed by press forming from a single plate material and includes a fitting part 101A different from that of the first embodiment. The fitting part 101A is inclined with respect to a substrate part 83 and a plate part 85 from a side close to the substrate part 83 and the plate part 85 of a guide part 82 and protrudes outward from the guide part 82.

The fitting part 101A includes a flat plate-shaped extension plate part 102A extending from an end edge portion of the substrate part 83 on the plate part 85 side to a side opposite to the plate parts 84 and 85 in a plate thickness direction of the substrate part 83 to be inclined at an angle of 135° with respect to the substrate part 83, a flat plate-shaped extension plate part 103A extending from an end edge portion of the plate part 85 on the substrate part 83 side to a side opposite to the plate parts 84 and 85 in the plate thickness direction of the substrate part 83 to be inclined at an angle of 135° with respect to the plate part 85, and a flat plate-shaped connection plate part 104A connecting both end edge portions of the extension plate part 102A and the extension plate part 103A on a side opposite to the guide part 82.

In other words, the fitting part 101A has a curl shape that extends in a direction away from the plate part 85 in the plate thickness direction of the substrate part 83 from the end edge portion of the substrate part 83 of the guide part 82 on the plate part 85 side at an obtuse angle with respect to the substrate part 83 and then is folded toward a side opposite to the substrate part 83 to be connected to the plate part 85 at an obtuse angle. The extension plate part 102A and the extension plate part 103A are parallel to each other. A distance between outer surfaces of the extension plate part 102A and the extension plate part 103A facing in opposite directions in the disc radial direction is larger than a distance between the side surface 63A and the side surface 65A of the recessed part 53A by an amount corresponding to a predetermined tightening allowance.

In the pad spring 26A, the guide part 82 is fitted to the pad guide part 48A of the inner side torque receiving part 32A on the disc rotation direction exit side. At that time, the pad spring 26A is fitted to the recessed part 53A while the fitting part 101A is elastically deformed in the disc radial direction. Therefore, the guide part 82 of the pad spring 26A comes into contact with the pad guide part 48A so that the plate part 84 comes into contact with the wall surface 61 by surface contact, the substrate part 83 comes into contact with the bottom surface 52 by surface contact, and the plate part 85 comes into contact with the wall surface 62 by surface contact. Also, the fitting part 101A of each pad spring 26A is configured such that the extension plate part 102A comes into contact with the side surface 63A by surface contact, and the extension plate part 103A comes into contact with the side surface 65A by surface contact. In other words, the guide part 82 of the pad spring 26A elastically fits into the pad guide part 48A, and at that time, the fitting part 101A elastically fits into the recessed part 53A. In this state, the fitting part 101A is separated from the back bottom surface 64A of the recessed part 53A.

Therefore, the guide part 82 of the pad spring 26A is provided to be able to come into contact with the wall surface 61 and the bottom surface 52 of the pad guide part 48A on the disc radial direction outer side. Also, the fitting part 101A of the pad spring 26A protrudes in the disc rotation direction from the guide part 82 and elastically fits into the recessed part 53A of the pad guide part 48A. In other words, when the fitting part 101A is elastically deformed in the disc radial direction and fitted into the recessed part 53A, the fitting part 101A applies an elastic force to the side surface 63A on the disc radial direction outer side and the side surface 65A on the disc radial direction inner side of the recessed part 53A.

In the pad spring 26A in a state of being attached to the pad guide part 48A, the fitting part 101A protrudes from the guide part 82 to the center side of the disc 11 in the extension direction of the radial direction reference line and the disc rotation direction outer side and is elastically fitted into the recessed part 53A that is recessed in the same shape in the pad guide part 48A. The extension plate part 102A of the fitting part 101A extends from an end edge portion of the substrate part 83 on the disc radial direction inner side toward the center side of the disc 11 in the extension direction of the radial direction reference line and the disc rotation direction outer side. Also, the extension plate part 103A extends from an end edge portion of the plate part 85 on the disc rotation direction outer side toward the center side of the disc 11 in the extension direction of the radial direction reference line and the disc rotation direction outer side. Further, the connection plate part 104A connects both end edge portions of the extension plate part 102A and the extension plate part 103A on a side opposite to the guide part 82 in a direction perpendicular to them.

In other words, the fitting part 101A has a curl shape that extends from an end edge portion of the substrate part 83 of the guide part 82 on the disc radial direction inner side to the center side of the disc 11 in the extension direction of the radial direction reference line and the disc rotation direction outer side and then is folded toward the disc radial direction inner side to be connected to the plate part 85. The fitting part 101A protrudes obliquely toward the center side of the disc 11 in the extension direction of the radial direction reference line and the disc rotation direction outer side with respect to the substrate part 83 that is able to come into contact with the bottom surface 52. The fitting part 101A is provided at an end portion of the guide part 82 on the disc radial direction inner side.

The disc brake 10A of the present second embodiment has the same configuration as the disc brake 10 of the above-described first embodiment except that all the recessed parts 53 have been changed to the recessed parts 53A and all the fitting parts 101 have been changed to the parts 101A as described above.

In the disc brake 10A of the present second embodiment, the recessed part 53A of the pad guide part 48A is recessed to be inclined with respect to the bottom surface 52 of the pad guide part 48A. Then, the fitting part 101A of the pad spring 26A protrudes to be inclined with respect to the substrate part 83 that is able to come into contact with the bottom surface 52, and the fitting part 101A elastically fits into the recessed part 53A. Therefore, a portion of the guide part 82 of the pad spring 26A on the disc radial direction inner side trying to rise upward to the disc rotation direction inner side can be further suppressed by the recessed part 53A and the fitting part 101A that are fitted to each other to be inclined with respect to that direction. Therefore, a slight-pressure squeal caused by such rising up of the guide part 82 of the pad spring 26A can be further suppressed.

The gist of the above-described embodiments will be summarized below.

A first aspect of the present invention is a disc brake which brakes rotation of a disc rotating together with wheels of a vehicle, and when a rotation direction of the disc is a disc rotation direction, a direction in which a central axis of the disc extends is a disc axial direction, a center side of the disc in a radial direction is a disc radial direction inner side, and a side opposite to the center side of the disc in the radial direction is a disc radial direction outer side, the disc brake includes an attachment member configured to be attached to a non-rotating portion of the vehicle and having a pad guide part having a shape recessed in the disc rotation direction, a pair of friction pads having a protruding part inserted into the pad guide part and configured to be movable in the disc axial direction by the protruding part being guided by the pad guide part, a caliper provided to be slidable with respect to the attachment member and configured to press the pair of friction pads against both sides of the disc, and a pad spring attached to the attachment member and elastically supporting each of the friction pads, in which the pad guide part includes a recessed part, which is recessed in the disc rotation direction with respect to a bottom surface in a region on the disc radial direction outer side, in a region of a bottom part of the pad guide part on the disc radial direction inner side, and the pad spring includes a guide part provided to be able to come into contact with a wall surface and the bottom surface of the pad guide part on the disc radial direction outer side and configured to guide movement of the protruding part in the disc axial direction, and a fitting part protruding in the disc rotation direction from the guide part and configured to elastically fit into the recessed part.

According to this configuration, it is possible to suppress a slight-pressure squeal which is a brake squeal generated during slight-pressure braking.

In the second aspect, in the first aspect, the fitting part has a curl shape that extends in the disc rotation direction from the guide part and then is folded toward the disc radial direction inner side, and applies an elastic force to a side surface on the disc radial direction outer side and a side surface on the disc radial direction inner side of the recessed part by being elastically deformed in the disc radial direction and fitted into the recessed part.

In the third aspect, in the first or second aspect, the recessed part is recessed perpendicular to the bottom surface, and the fitting part protrudes perpendicular to a bottom surface contact part of the guide part that is able to come into contact with the bottom surface.

In the fourth aspect, in the first or second aspect, the recessed part is recessed to be inclined with respect to the bottom surface, and the fitting part protrudes to be inclined with respect to a bottom surface contact part of the guide part that is able to come into contact with the bottom surface.

INDUSTRIAL APPLICABILITY

According to the present invention, a slight-pressure squeal generated during slight-pressure braking can be suppressed. Therefore, industrial applicability is high.

REFERENCE SIGNS LIST 10, 10A Disc brake
11 Disc
21, 21A Attachment member
22 Caliper
25 Friction pad
26, 26A Pad spring
48, 48A Pad guide part
51, 51A Bottom part
52 Bottom surface
53, 53A Recessed part
61 Wall surface
63, 63A Side surface
65, 65A Side surface
82 Guide part
83 Substrate part (bottom surface contact part)
101, 101A Fitting part
132 Protruding part

The invention claimed is:

1. A disc brake which brakes rotation of a disc rotating together with wheels of a vehicle, and when a rotation direction of the disc is a disc rotation direction, a direction in which a central axis of the disc extends is a disc axial direction, a center side of the disc in a radial direction is a disc radial direction inner side, and a side opposite to the center side of the disc in the radial direction is a disc radial direction outer side, the disc brake comprising:

an attachment member configured to be attached to a non-rotating portion of the vehicle and including a pad guide part having a shape recessed in the disc rotation direction;
a pair of friction pads each including a protruding part inserted into the pad guide part and configured to be movable in the disc axial direction by the protruding part being guided by the pad guide part;
a caliper provided to be slidable with respect to the attachment member and configured to press the pair of friction pads against both sides of the disc; and
a pad spring attached to the attachment member and elastically supporting each of the friction pads, wherein
the pad guide part includes a recessed part, which is recessed in the disc rotation direction with respect to a bottom surface in a region on the disc radial direction outer side, in a region of a bottom part of the pad guide part on the disc radial direction inner side, and
the pad spring includes:
a guide part provided to be able to come into contact with a wall surface and the bottom surface of the pad guide part on the disc radial direction outer side and configured to guide movement of the protruding part in the disc axial direction; and
a fitting part protruding in the disc rotation direction from the guide part and configured to elastically fit into the recessed part,
wherein the recessed part is recessed to be inclined with respect to the bottom surface, and
wherein the fitting part protrudes to be inclined with respect to a bottom surface contact part of the guide part which is able to come into contact with the bottom surface.

2. The disc brake according to claim 1, wherein the fitting part has a curl shape which extends in the disc rotation direction from the guide part and then is folded toward the disc radial direction inner side, and applies an elastic force to a side surface on the disc radial direction outer side and a side surface on the disc radial direction inner side of the recessed part by being elastically deformed in the disc radial direction and fitted into the recessed part.

* * * * *